(No Model.) 2 Sheets—Sheet 1.

M. E. REISERT.
AUTOMATIC WEIGHING APPARATUS.

No. 414,080. Patented Oct. 29, 1889.

(No Model.)  2 Sheets—Sheet 2.
M. E. REISERT.
AUTOMATIC WEIGHING APPARATUS.
No. 414,080. Patented Oct. 29, 1889.
FIG_3_
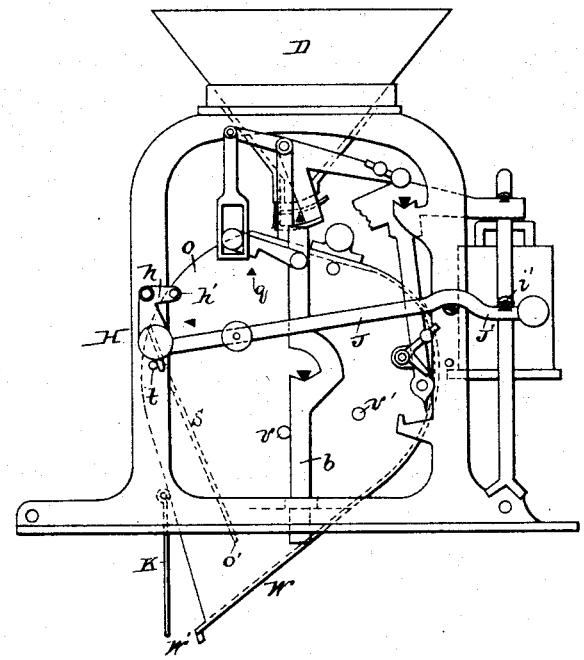
Attest:
Wm S. Hodges.
Inventor:
Michael E. Reisert,
by Paine & Ladd.
attys.

UNITED STATES PATENT OFFICE.

MICHAEL EDUARD REISERT, OF HENNEF, PRUSSIA, GERMANY, ASSIGNOR TO THE HENNEFER MASCHINEN-FABRIK C. REUTHER & REISERT, OF SAME PLACE.

AUTOMATIC WEIGHING APPARATUS.

SPECIFICATION forming part of Letters Patent No. 414,080, dated October 29, 1889.

Application filed February 13, 1889. Serial No. 299,803. (No model.) Patented in England June 5, 1886, No. 7,554, and in Germany December 24, 1886, No. 42,602.

*To all whom it may concern:*

Be it known that I, MICHAEL EDUARD REISERT, a subject of the Emperor of Germany, and a resident of Hennef, in the Kingdom of Prussia and German Empire, have invented certain new and useful Improvements in Automatic Weighing Apparatus, (for which I have secured Letters Patent in Great Britain, No. 7,554, dated June 5, 1886, and in Germany, No. 42,602, dated December 24, 1886,) of which the following is a specification.

My invention relates to improvements in that class of automatical weighing apparatus in which the receptacle for receiving the material to be weighed empties itself by tilting, and more especially of the weighing apparatus as described in my former Letters Patent, numbered 376,965 and dated January 24, 1888; and the objects of my improvements are, first, to secure exact uniform movement of the scale-beam during the closing of the supply-flap, and, second, to provide means for reducing the vibrating (tilting) movement of the weighing-receptacle. I attain these objects by the mechanism illustrated in the accompanying drawings, in which—

Figure 1:
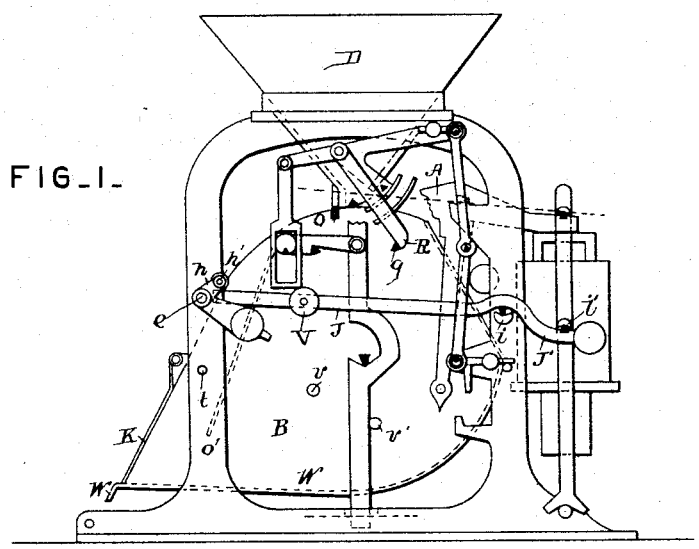
Figure 2:
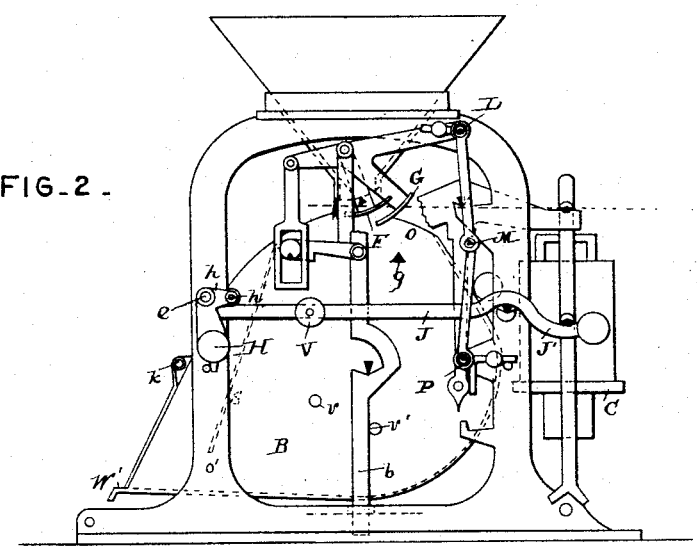

Figures 1, 2, and 3 are side elevations of the weighing apparatus embodying my improvements, moving parts in each of the figures being in different positions to better illustrate the operation of my said invention.

Similar letters refer to similar parts throughout the several views.

A is the scale-beam; B, the receptacle for receiving the material to be weighed; C, the weight. The material to be weighed enters through the hopper D into the receptacle B, which, when exactly filled, empties itself automatically. Beneath the hopper D oscillate two flaps F and G. The upper one serves to reduce, shortly before the evacuation of the receptacle B, the supply-openings to small slits arranged in the said flap, and the lower one G stops entirely the supply of material. The lever J J', pivoted upon knife-edges $i$, either engages the knife-edge $i'$ under the weight C or overcharges directly the suspension-rod $b$ of the receptacle B. Upon the arm J of this lever bears the weight H, which is supported and pivoted by the pin $e$, attached to the frame of the apparatus. The arm $h$ of the weight H presses, by means of the roller $h'$, upon the lever J.

In the position Fig. 1, the material entering through the hopper D, and the lever J J', charged by the weight H, influences the scale-beam A. After sufficient material has been introduced into the receptacle B, so as to equipoise the balance, the receptacle B descends with its suspension-rod $b$, and the lever-arm J following its movement until the weight H arrives at the position, Fig. 2, perpendicularly to its pivot $e$. By this motion the projection $q$ becomes free from the lever R, thus allowing the flap F to drop, while the flap G is maintained still in open position by the toggle L M P. During the described movement of the scale-beam the weight H swings around the pivot $e$. As the center of gravity of the weight H lies in the position, Fig. 1, beneath the line horizontally drawn through the axis of the pivot $e$, the momentum of the weight H, and thereby its influence upon the lever J and the scale-beam, will successively decrease during its oscillating motion. This effect will decrease more rapidly if the actual length of the arm $h$, pressing by the roller $h'$ upon the lever J, increases during its downward movement, as will be understood when comparing the different positions of the weighted lever $h$ in Figs. 1 and 2 of the drawings. The position of the weight H is such that a part of its original pressure upon the scale-beam still remains in action, even after it already touches the stud $t$, until by further supply of material through the slits of the flap F the scale-beam equipoises again. In consequence of the described decreasing pressure of the weight H upon the scale-beam, which is obtained by its special arrangement, a slow and steady movement of the scale-beam from the resting position of Fig. 1 into that of Fig. 2 is effected. Thus the beam is protected against the shock of the entering material, which otherwise would cause the scale to pass prematurely the necessary second resting position, Fig. 2. After the overcharging-weight H has arrived at the stud $t$ its action upon the scale-pan C ceases and the scale will come again to rest, and there is only still the influence of the lever J, the further action of which, in conjunction with several other features of automatic scales, is particularly described in the specification of my Letters Patent aforesaid. However, it is evident that the lever J may be entirely abandoned and the overcharging-weight H adapted to directly act upon the scale-beam.

In cases where tilting receptacles have been employed in automatic scales the filling and emptying of the same were effected through the same opening, which requires for entire evacuation a considerably large oscillating motion of the receptacle from the one extreme position into the other. This, however, will cause shocks and sometimes other disturbances in the working parts of the apparatus, which can be advantageously avoided by diminishing the angle of the oscillation to the least possible degree. To effect this my improved weighing-receptacle is provided with separate openings O O', as well for the reception of the material to be weighed as for the emptying or discharge of the same, and the shape of the receptacle and its position in the scale are so arranged that while the material to be weighed enters through the upper opening O of the receptacle the bottom W of the latter is in a horizontal position or nearly so, Figs. 1 and 2, determined by means of a stud $v'$, bearing against the rod $b$. The arrangement is such that for the emptying or discharge through the lower opening O' the receptacle needs to tilt over only so much that the oscillation, which may be limited by a stud $v$, bearing against the rod $b$, will exceed very little the natural angle of inclination of the heaped material. This position of the receptacle is shown in Fig. 3. The openings O and O' are separated at one side of the receptacle by means of the wall S, the lower border $s$ of which, forming the upper border of the opening O', is at such a vertical distance from the bottom W and horizontally so far apart from the edge W' of the same that the material during its supply period will in no case reach to the edge W', even if the inclination of the heaped-up material has arrived at its utmost limit.

In order to prevent single parts of the granular material to be weighed to escape over the edge W', the opening O' is covered by means of a flap K, pivoted at $k$, the lower edge of which bears by its dead-weight against or near the edge W' of the bottom W of the receptacle, and it is adapted in such a manner that when the receptacle B tilts for emptying or discharging, Fig. 3, the flap K automatically opens until it reaches a position perpendicular to its pivot $k$, and thus allows the material to be discharged without obstruction.

Having now particularly described and ascertained the nature of my invention, and in what manner the same is to be performed, I declare that what I claim is—

1. In an automatic weighing apparatus, the combination, with the frame, of the pivoted receptacle, the lever J J', fulcrumed on said frame, the weight C, with which said lever engages, and the overcharging-weight H, pivoted to said frame and engaging the end of said lever, substantially as set forth.

2. In an automatic weighing apparatus, the combination, with the frame, of the pivoted receptacle, the lever J, fulcrumed on said frame and having a weight at one end, and the overcharging-weight H, pivoted to said frame and having a roller at one end bearing on said lever, substantially as set forth.

3. In an automatic weighing apparatus, the combination of the pivoted receptacle, the hopper, the upper supply-flap, the scale-beam, the lever weighted at one end, and the pivoted weight H, engaging the other end of said lever, substantially as set forth.

In testimony that I claim the foregoing as my invention I have signed my name, in presence of two witnesses, this 21st day of January, 1889.

MICHAEL EDUARD REISERT.

Witnesses:
GUSTAVE ALBERT OELRICHS,
ROBERT VORLÄNDER.